(12) United States Patent
Wang (10) Patent No.: US 12,276,062 B2
(45) Date of Patent: Apr. 15, 2025

(54) LAUNDRY APPLIANCE WITH AUTOMATIC SELF-CLEAN FILTER

(71) Applicant: Haier US Appliance Solutions, Inc., Wilmington, DE (US)

(72) Inventor: Bin Wang, Shanghai (CN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/796,966

(22) PCT Filed: Jul. 23, 2021

(86) PCT No.: PCT/CN2021/108033
§ 371 (c)(1),
(2) Date: Aug. 2, 2022

(87) PCT Pub. No.: WO2023/000284
PCT Pub. Date: Jan. 26, 2023

(65) Prior Publication Data
US 2024/0295066 A1 Sep. 5, 2024

(51) Int. Cl.
*D06F 58/22* (2006.01)
*B01D 46/18* (2006.01)
(Continued)

(52) U.S. Cl.
CPC ............. *D06F 58/22* (2013.01); *B01D 46/18* (2013.01); *B01D 46/681* (2022.01); *D06F 25/00* (2013.01); *D06F 58/26* (2013.01); *B01D 2279/55* (2013.01)

(58) Field of Classification Search
CPC .......... D06F 58/22; D06F 39/10; D06F 25/00; D06F 58/26
See application file for complete search history.

(56) References Cited

U.S. PATENT DOCUMENTS 4,435,909 A * 3/1984 Williamson, Jr. .... F26B 25/007
55/352
9,062,410 B2 6/2015 Ahn et al.
(Continued)

FOREIGN PATENT DOCUMENTS

CN 102257208 A 11/2011
CN 102535130 A 7/2012
(Continued)

OTHER PUBLICATIONS

Machine translation of JP 2015-002847 A to Toshiba Corp. (Year: 2015).*

(Continued)

*Primary Examiner* — Joseph L. Perrin
(74) *Attorney, Agent, or Firm* — Dority & Manning, P.A.

(57) ABSTRACT

A laundry appliance includes a cabinet that defines an interior volume with a laundry basket rotatably mounted therein. The laundry basket defines a chamber for the receipt of articles for treatment. The laundry appliance also includes a heating system in thermal communication with the chamber whereby heated air flows from the heating system to the chamber. An air filter is positioned between the laundry basket and the heating system upstream of the heating system, whereby a flow of return air from the chamber passes through and is filtered by the air filter before flowing to the heating system. The laundry appliance also includes a brush in contact with the air filter along one edge of the air filter and a motor operatively connected to the air filter. The motor is configured to rotate the air filter past and across the brush to thereby clean the air filter.

16 Claims, 9 Drawing Sheets

(51) Int. Cl.
　　　*B01D 46/681*　　(2022.01)
　　　*D06F 25/00*　　　(2006.01)
　　　*D06F 58/26*　　　(2006.01)

(56) References Cited

U.S. PATENT DOCUMENTS

| | | | |
|---|---|---|---|
| 2009/0158933 A1 | 6/2009 | Schaub | |
| 2010/0154241 A1* | 6/2010 | Ahn | D06F 58/22 34/82 |
| 2011/0271543 A1* | 11/2011 | Kim | D06F 58/22 34/90 |
| 2013/0145645 A1* | 6/2013 | Kim | D06F 58/22 34/480 |
| 2018/0030645 A1* | 2/2018 | Kulkarni | D06F 58/22 |
| 2019/0093279 A1* | 3/2019 | Grider | D06F 58/22 |
| 2019/0345662 A1* | 11/2019 | Hato | D06F 58/22 |
| 2020/0238202 A1* | 7/2020 | Renz | B01D 29/09 |

FOREIGN PATENT DOCUMENTS

| | | | |
|---|---|---|---|
| CN | 112853702 A | 5/2021 | |
| EP | 3674476 B1 * | 3/2021 | B01D 45/14 |
| JP | 2006271829 A | 10/2006 | |
| JP | 2015002847 A | 1/2015 | |
| KR | 101177479 B1 | 8/2012 | |
| KR | 101199392 B1 | 11/2012 | |

OTHER PUBLICATIONS

International Search Report Corresponding to Application No. PCT/CN2021/108033 on Apr. 20, 2022, 9 pages.

* cited by examiner

LAUNDRY APPLIANCE WITH AUTOMATIC SELF-CLEAN FILTER

CROSS-REFERENCE TO RELATED APPLICATIONS

The present application is the National Stage Entry of and claims the benefit of priority under 35 U.S.C. § 371 to PCT Application Serial No. PCT/CN2021/108033 filed Jul. 23, 2021 and entitled LAUNDRY APPLIANCE WITH AUTOMATIC SELF-CLEAN FILTER, which is hereby incorporated by reference in its entirety.

FIELD OF THE INVENTION

The present subject matter relates generally to laundry appliances, and more particularly to laundry appliances with an automatically self-cleaning filter.

BACKGROUND OF THE INVENTION

Combination laundry appliances, sometimes also referred to as washer/dryer appliances, provide both washing and drying functions in a single unit. Some combination laundry appliances provide condensation drying, wherein moisture is removed from wetting air within the laundry as least in part by condensation on a condensation surface, such as a surface of a heat exchanger.

During the washing and drying operations, particles from clothing articles being treated therein, such as fiber particles, are dislodged and may become entrained in the flow of air through the laundry appliance. Such particles, e.g., lint, may impair the performance of the laundry appliance's heating system if the particles are carried to, for example, a heater of the heating system, by the flow of air. Thus, laundry appliances typically include at least one air filter, sometimes also referred to as a lint filter, to entrap such particles and remove the particles from the air flow. However, conventional filters may require frequent cleaning and may create undesired conditions if the filter is not cleaned, e.g., if the user forgets to clean the filter about once per operating cycle. In particular, some combination laundry appliances include an air filter in a position that is difficult or inconvenient for the user to access, making proper cleaning of the air filter more challenging.

Accordingly, a laundry appliance having improved features for air filtration, such as features for automatically cleaning an air filter therein, would be advantageous.

BRIEF DESCRIPTION OF THE INVENTION

Aspects and advantages of the invention will be set forth in part in the following description, or may be obvious from the description, or may be learned through practice of the invention.

In one aspect of the present disclosure, a laundry appliance is provided. The laundry appliance includes a cabinet that defines an interior volume with a laundry basket rotatably mounted within the interior volume of the cabinet. The laundry basket defines a chamber for the receipt of articles for treatment. The laundry appliance also includes a heat exchange system in thermal communication with the chamber whereby heated air flows from the heat exchange system to the chamber. An air filter is positioned between the laundry basket and the heat exchange system upstream of the heat exchange system, whereby a flow of return air from the chamber passes through and is filtered by the air filter before flowing to the heat exchange system. The laundry appliance also includes a brush in contact with the air filter along one edge of the air filter and a motor operatively connected to the air filter. The motor is configured to rotate the air filter past and across the brush to thereby clean the air filter.

In another aspect of the present disclosure, an air filter system for a laundry appliance is provided. The air filter system includes an air filter that is configured to be positioned between a laundry basket and a heat exchange system of the laundry appliance upstream of the heat exchange system, whereby a flow of return air from the laundry basket passes through and is filtered by the air filter before flowing to the heat exchange system. The air filter system also includes a brush in contact with the air filter along one side of the air filter and a motor operatively connected to the air filter. The motor is configured to rotate the air filter past and across the brush to thereby clean the air filter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "substantially," "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As used herein, the terms "articles," "clothing," or "laundry" include but need not be limited to fabrics, textiles, garments, linens, papers, or other items which may be cleaned, dried, and/or otherwise treated in a laundry appliance. Furthermore, the term "load" or "laundry load" refers to the combination of clothing that may be washed together in a washing machine appliance or dried together in a dryer appliance (e.g., clothes dryer), including washed and dried together in a combination laundry appliance, and may include a mixture of different or similar articles of clothing of different or similar types and kinds of fabrics, textiles, garments and linens within a particular laundering process.

Figure 1:
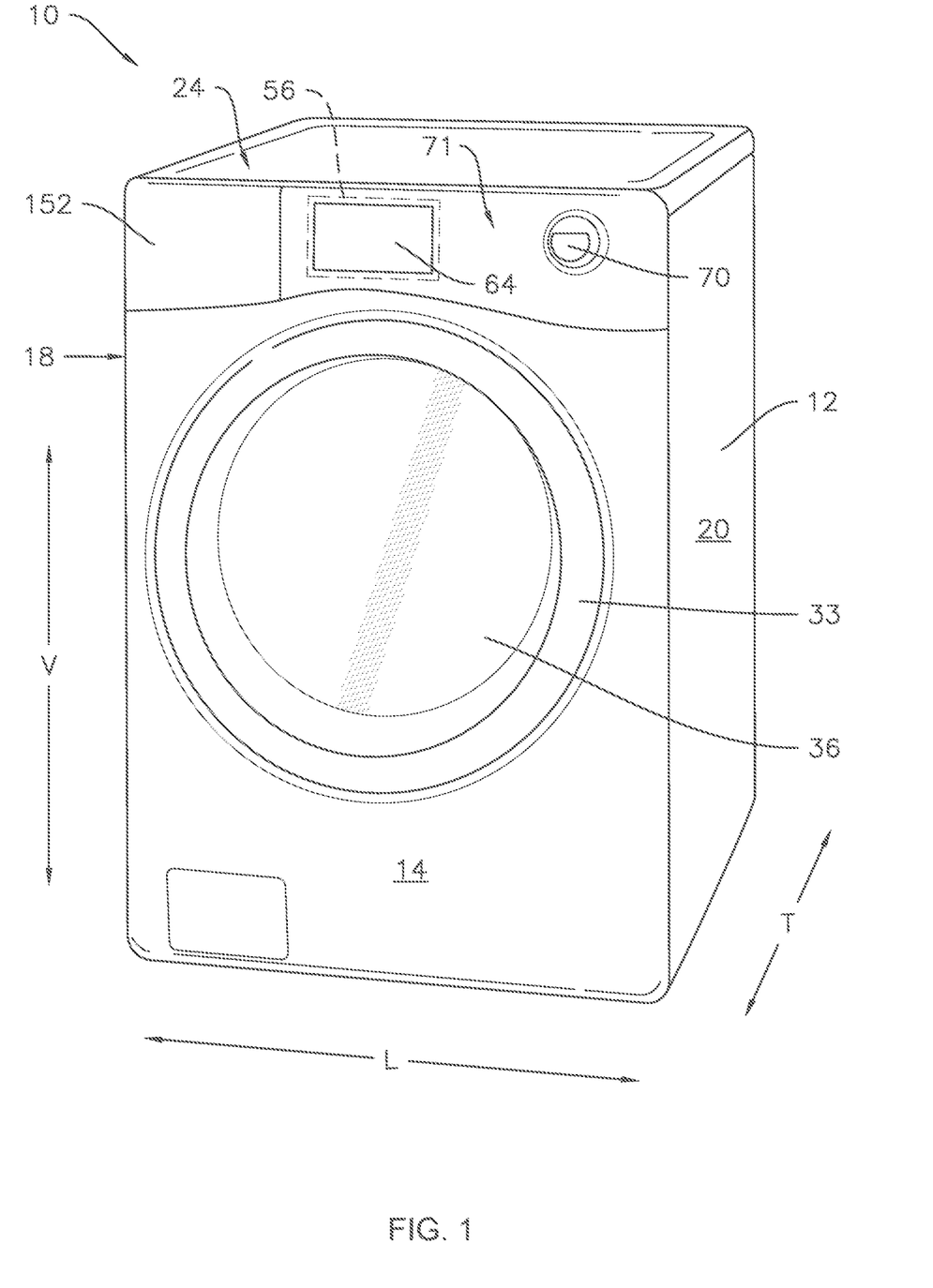
FIG. 1 provides a perspective view of a laundry appliance in accordance with one or more exemplary embodiments of the present disclosure.
Figure 2:
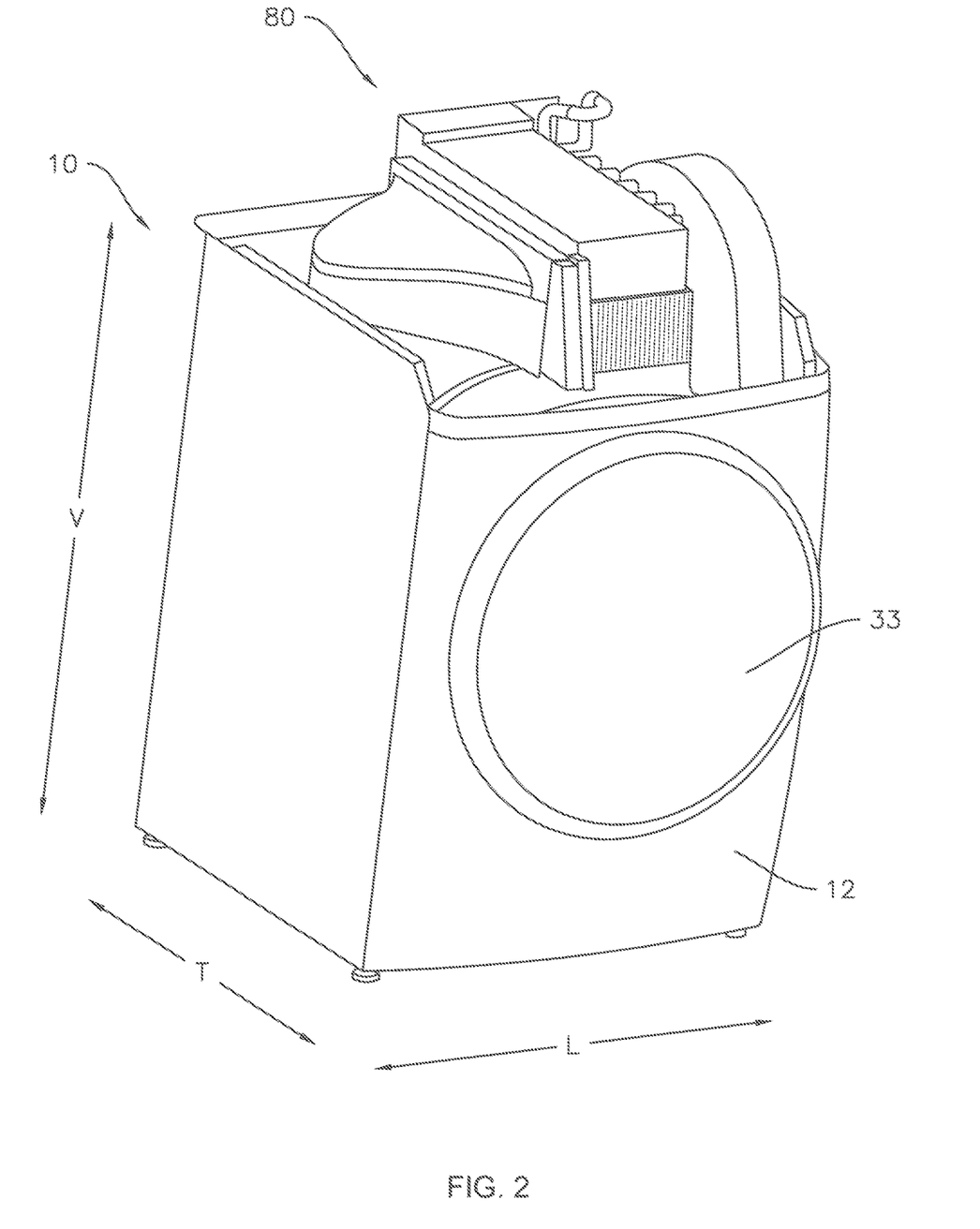
FIG. 2 provides a perspective view of the laundry appliance of FIG. 1 with a portion of a cabinet thereof removed to show a heat exchange system of the laundry appliance in accordance with one or more exemplary embodiments of the present disclosure.
Figure 3:
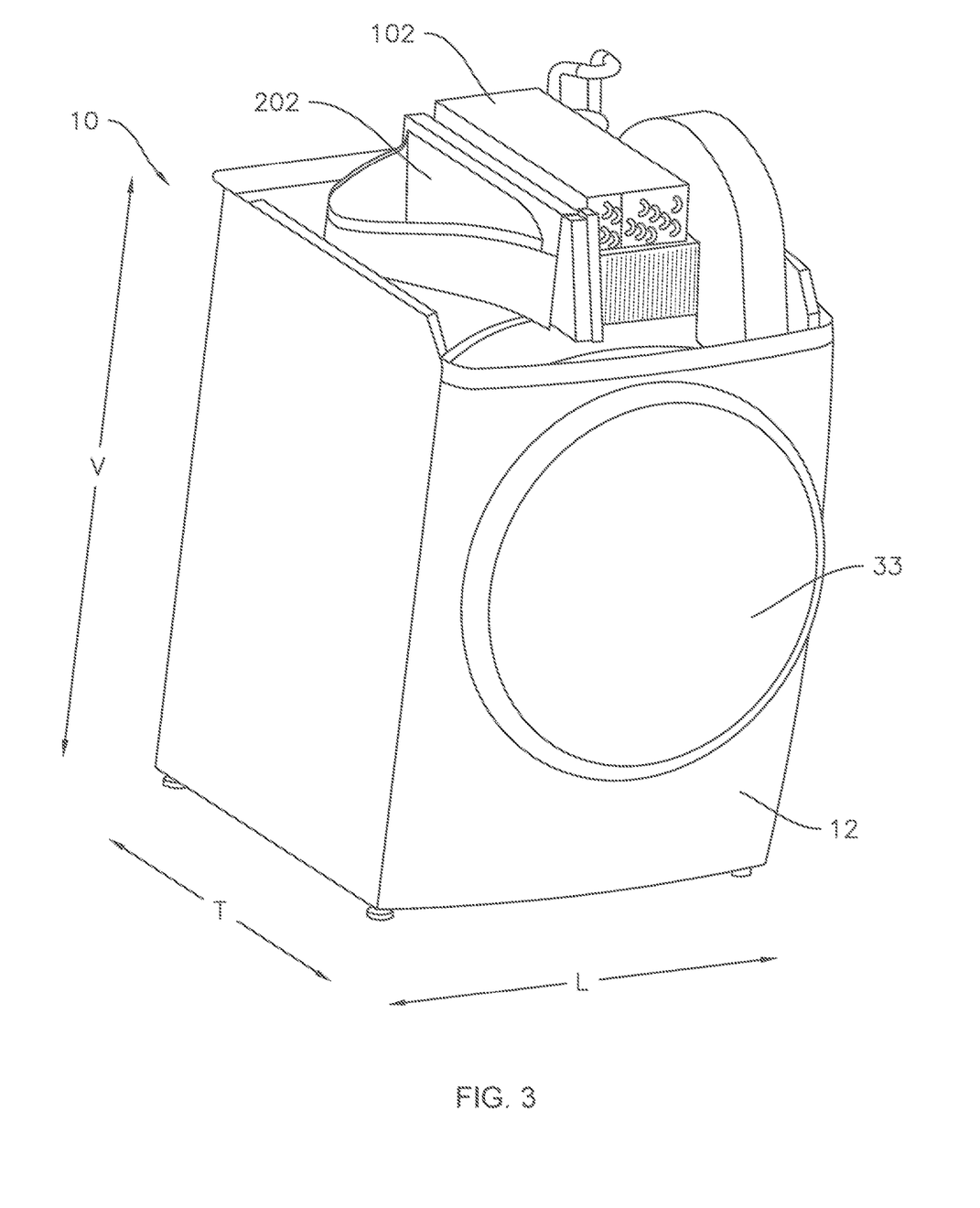
FIG. 3 provides another perspective view of the laundry appliance of FIG. 1 with portions of various housings of the heat exchange system removed to show an air filter system therein in accordance with one or more exemplary embodiments of the present disclosure.
Figure 4:
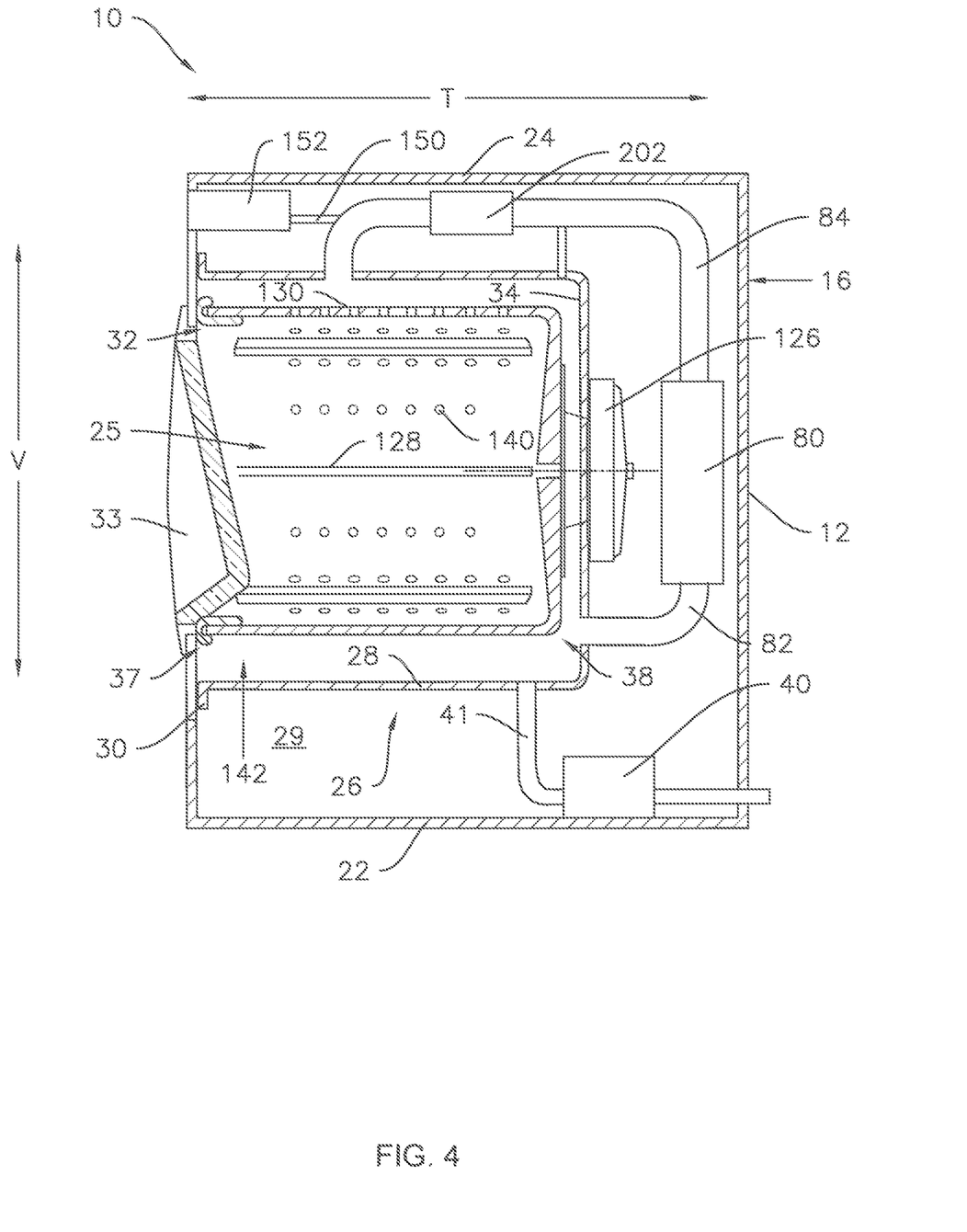
FIG. 4 provides a schematic cross-section view of the example laundry appliance of FIG. 1.

Embodiments of the present disclosure include a laundry appliance, e.g., a combination washer-dryer appliance, such as the example combination appliance 10 illustrated in FIGS. 1 through 4. FIG. 1 provides a perspective view of a laundry appliance 10 according to exemplary embodiments of the present disclosure. The laundry appliance 10 is a combination laundry appliance, and may also be referred to as a multifunction laundry appliance or washer/dryer combination appliance. FIGS. 2 and 3 provide additional perspective views of the laundry appliance 10. FIG. 4 provides a section view of laundry appliance 10. The laundry appliance 10 generally defines a vertical direction V, a lateral direction L, and a transverse direction T, each of which is mutually perpendicular, such that an orthogonal coordinate system is defined. While described in the context of a specific embodiment of laundry appliance 10, using the teachings disclosed herein, it will be understood that laundry appliance 10 is provided by way of example only. Other laundry appliances having different appearances and different features may also be utilized with the present subject matter as well.

Cabinet 12 includes a front panel 14, a rear panel 16, a left side panels 18 and a right side panel 20 spaced apart from each other by front and rear panels 14 and 16, a bottom panel 22, and a top cover 24. As used herein, terms such as "left" and "right" or "front" and "back" refer to directions from the perspective of a user facing the laundry appliance 10 for accessing and/or operating the laundry appliance 10. For example, a user stands in front of the laundry appliance 10, e.g., at or near the front panel 14, to access door 33 and/or inputs 70 (the door 33 and inputs 70 are described in more detail below). Within cabinet 12, an interior volume 29 is defined. A drum or tub 26 is mounted within the interior volume 29. A laundry basket 130 is mounted within the tub 26. The laundry basket 130 defines a chamber 25 for receipt of articles of clothing for treatment, e.g., washing, rinsing, spinning, tumbling, and/or drying.

In some embodiments, one or more selector inputs 70, such as knobs, buttons, touchscreen interfaces, etc., may be provided or mounted on the cabinet 12, e.g., on a control panel 71 thereof and are in operable communication (e.g., electrically coupled or coupled through a wireless network band) with a processing device or controller 56. The control panel 71 may also include a display 64. Controller 56 may also be provided in operable communication with various components of the dryer appliance, such as the motor, blower, and/or heating system 80. In turn, signals generated in controller 56 direct operation of such components in response to the position of inputs 70. As used herein, "processing device" or "controller" may refer to one or more microprocessors, microcontroller, ASICS, or semiconductor devices and is not restricted necessarily to a single element. The controller 56 may be programmed to operate laundry appliance 10 by executing instructions stored in memory (e.g., non-transitory media). The controller 56 may include, or be associated with, one or more memory elements such as RAM, ROM, or electrically erasable, programmable read only memory (EEPROM). For example, the instructions may be software or any set of instructions that when executed by the processing device, cause the processing device to perform operations. It should be noted that controllers as disclosed herein are capable of and may be operable to perform any methods and associated method steps as disclosed herein. For example, in some embodiments, methods disclosed herein may be embodied in programming instructions stored in the memory and executed by the controller.

Tub 26 extends between a front portion 37 and a back portion 38. Tub 26 is generally cylindrical in shape, having an outer cylindrical wall 28 and a front flange or wall 30 that defines an opening 32 of tub 26, e.g., at front portion 37 of tub 26, for loading and unloading of articles into and out of a chamber 25 defined by and within a laundry basket 130 inside of the tub 26. Tub 26 includes a rear wall 34 opposite the front flange 30. A door 33 provides for closing or accessing tub 26 through opening 32. A window 36 (FIG. 1) may be provided in door 33 for viewing of the chamber 25 and/or laundry articles therein, e.g., during operation of the laundry appliance 10.

Laundry basket 130 is rotatably mounted within tub 26 such that the laundry basket 130 is rotatable about an axis of rotation. According to the illustrated embodiment, the axis of rotation is substantially parallel to the transverse direction T. In this regard, laundry appliance 10 is generally referred to as a "horizontal axis" or "front load" laundry appliance 10. However, it should be appreciated that aspects of the present subject matter may be used within the context of a vertical axis or top load laundry appliance as well.

Laundry appliance 10 includes a motor assembly 126 that is in mechanical communication with laundry basket 130 to selectively rotate laundry basket 130. The motor assembly 126 may be a pancake motor, as illustrated, or any other suitable type, size, or configuration of motor may be used to rotate laundry basket 130 according to various embodiments. For example, a motor, such as a brushless DC motor, may be mounted within the cabinet 12 and the motor may be coupled to the laundry basket 130 by a belt and pulley, whereby the motor rotates the laundry basket 130 through the belt and pulley.

Laundry basket 130 may define one or more agitator features that extend into chamber 25 to assist in agitation and cleaning of articles disposed within laundry chamber 25 during operation of laundry appliance 10. For example, as illustrated in FIG. 4, a plurality of ribs 128 extends from laundry basket 130 into chamber 25. In this manner, for example, ribs 128 may lift articles disposed in laundry basket 130 during rotation of laundry basket 130, such as during an agitation or rinse portion of a wash operation of the laundry appliance 10. During a drying operation of the laundry appliance 10, the ribs 128 may also lift articles in the chamber 25 of the laundry basket 130 and then allow such articles to tumble back to a bottom of laundry basket 130 as laundry basket 130 rotates.

As illustrated for example in FIG. 4, laundry basket 130 may also include a plurality of perforations 140 extending therethrough in order to facilitate fluid communication between chamber 25 and tub 26, e.g., whereby wash liquid may flow between the tub 26 and the chamber 25 during a wash operation or cycle and/or heated air may flow into the chamber 25 and moisture-laden air may flow out of the chamber 25 during a drying operation or cycle. A sump 142 is defined by tub 26 outside of laundry basket 130 at a bottom of the tub 26 along the vertical direction V. Thus, sump 142 is configured for receipt of, and generally collects, wash liquid (the wash liquid may include, e.g., water, and may also includes additives such as detergents, etc.) during wash operations of laundry appliance 10. For example, during a wash operation of laundry appliance 10, wash liquid may be urged (e.g., by gravity) from the chamber 25 within the laundry basket 130 to sump 142 through the plurality of perforations 140. A pump assembly 40 is located beneath tub 26 for gravity assisted flow when draining tub 26 (e.g., via a drain 41). Pump assembly 40 is also configured for recirculating wash liquid within tub 26.

In some embodiments, laundry appliance 10 includes an additive dispenser or spout 150. For example, spout 150 may be in fluid communication with a water supply (not shown) in order to direct fluid (e.g., clean water) into tub 26. Spout 150 may also be in fluid communication with the sump 142. For example, pump assembly 40 may direct wash liquid disposed in sump 142 to spout 150 in order to circulate wash liquid in tub 26.

As illustrated, a detergent dispenser drawer 152 may be slidably mounted within front panel 14. Detergent dispenser drawer 152 receives an additive (e.g., detergent, fabric softener, bleach, or any other suitable liquid or powder) and directs the additive to chamber 25 during operation of laundry appliance 10. According to the illustrated embodiment, detergent dispenser drawer 152 may also be fluidly coupled to spout 150 to facilitate the complete and accurate dispensing of the additive.

In exemplary embodiments, during operation of laundry appliance 10, laundry items are loaded into laundry basket 130 through opening 32, and an operation is initiated through operator manipulation of input selectors 70. For example, a wash cycle may be initiated such that tub 26 is filled with water, detergent, or other fluid additives (e.g., via spout 150). One or more water valves (not shown) can be controlled by laundry appliance 10 to provide for filling laundry basket 130 to the appropriate level for the amount of articles being washed or rinsed. By way of example, once laundry basket 130 is properly filled with fluid, the contents of laundry basket 130 can be agitated (e.g., with ribs 128) for an agitation phase of laundry items in laundry basket 130. During the agitation phase, the basket 130 may be motivated about the axis of rotation at a set speed (e.g., a tumble speed) by a motor. As the basket 130 is rotated, articles within the basket 130 may be lifted by ribs 128 and permitted to drop therein due to gravity.

After the agitation phase of the washing operation is completed, tub 26 can be drained. Laundry articles can then be rinsed (e.g., through a rinse cycle) by again adding fluid to tub 26, depending on the particulars of the cleaning cycle selected by a user. Ribs 128 may again provide agitation within laundry basket 130. One or more spin cycles may also be used. In particular, a spin cycle may be applied after the wash cycle or after the rinse cycle in order to wring wash liquid from the articles being washed. During a spin cycle, basket 130 is rotated at relatively high speeds. For instance, basket 130 may be rotated at one set speed (e.g., a pre-plaster speed) before being rotated at another set speed (e.g., a plaster speed). As would be understood, the pre-plaster speed may be greater than the tumble speed and the plaster speed may be greater than the pre-plaster speed. Moreover, agitation or tumbling of articles may be reduced as basket 130 increases its rotational velocity such that the plaster speed maintains the articles at a generally fixed position relative to basket 130.

After the spin cycle, a drying operation may begin. A supply duct 82 may be mounted to tub 26 and may extend between tub 26 and a heating assembly or system 80, whereby the tub 26 is downstream of the heating system 80 along the supply duct 82 such that the heating system 80 supplies heated air that has been heated by the heating system 80 to the tub 26 via the supply duct 82. A return duct 84 may also be mounted to the tub 26 and may extend between tub 26 and the heating system 80 whereby the tub 26 is upstream of the heating system 80 along the return duct 84 such that the heating system 80 receives relatively warm and humid air from the tub 26 via the return duct 84, e.g., air returns to the heating system 80 from the tub 26, e.g., after flowing over and around articles within the chamber 25, through the return duct 84. The supply duct 82 may be mounted to the tub 26, e.g., at the rear wall 34 thereof as in the illustrated example, or the supply duct 82 may be mounted to the cylindrical wall 28 of the tub 26, such as above the basket 130, similar to the return duct 84 in the illustrated example embodiment.

The heating system 80, may include, e.g., a resistance heating element, a gas burner, and/or a heat pump, such as the example heat pump embodiment illustrated in FIG. 6 and described in more detail below, or any other suitable heat source. Moisture laden, warm air is drawn from tub 26 by an air handler, such as a blower fan, which generates a negative air pressure within the chamber 25. As the air passes from the blower fan, it enters return duct 84 and then is passed into heating system 80. Heated air (with a lower moisture content than was received from tub 26), exits heating system 80 and is supplied to tub 26 by supply duct 82. After the clothing articles have been dried, they are removed from the chamber 25 via opening 32.

FIG. 2 provides a perspective view of laundry appliance 10 with a portion, e.g., an upper portion, of the cabinet 12 thereof removed to reveal components of an exemplary heating system 80 of the laundry appliance 10. As may be seen in FIG. 3, where portions of various housings of the heating system 80 are also removed, e.g., in addition to the portion of the cabinet 12, the heating system 80 may include a heat exchanger, e.g., evaporator 102 (described in more detail below with reference to FIG. 6) and an air filter 202 may be positioned between the laundry basket 130 and the heating system 80. For example, the air filter 202 may be positioned upstream of the heating system 80, such as upstream of the evaporator 102 of the heating system 80, e.g., where the evaporator 102 is the furthest upstream portion or component of the heating system 80, e.g., the first component of the heating system 80 to receive a flow of warm, moist air from the chamber 25. With the air filter 202 so positioned, a flow of return air 120 (FIG. 6) from the chamber 25 may pass through and may be filtered by the air filter 202 before flowing to the heating system 80. For example, the air filter 202 may include a mesh material which permits air to flow therethrough while trapping particles above a specified size therein. As may be appreciated from FIGS. 2 and 3, the air filter 202 is not readily accessible in that it is positioned within the cabinet 12 and within another housing inside of the cabinet 12, e.g., along and/or within the return duct 84. Accordingly, features described below for automatically cleaning the air filter 202 and thereby obviating the need to directly access the air filter 202 itself are desired in such laundry appliances.

Figure 5:
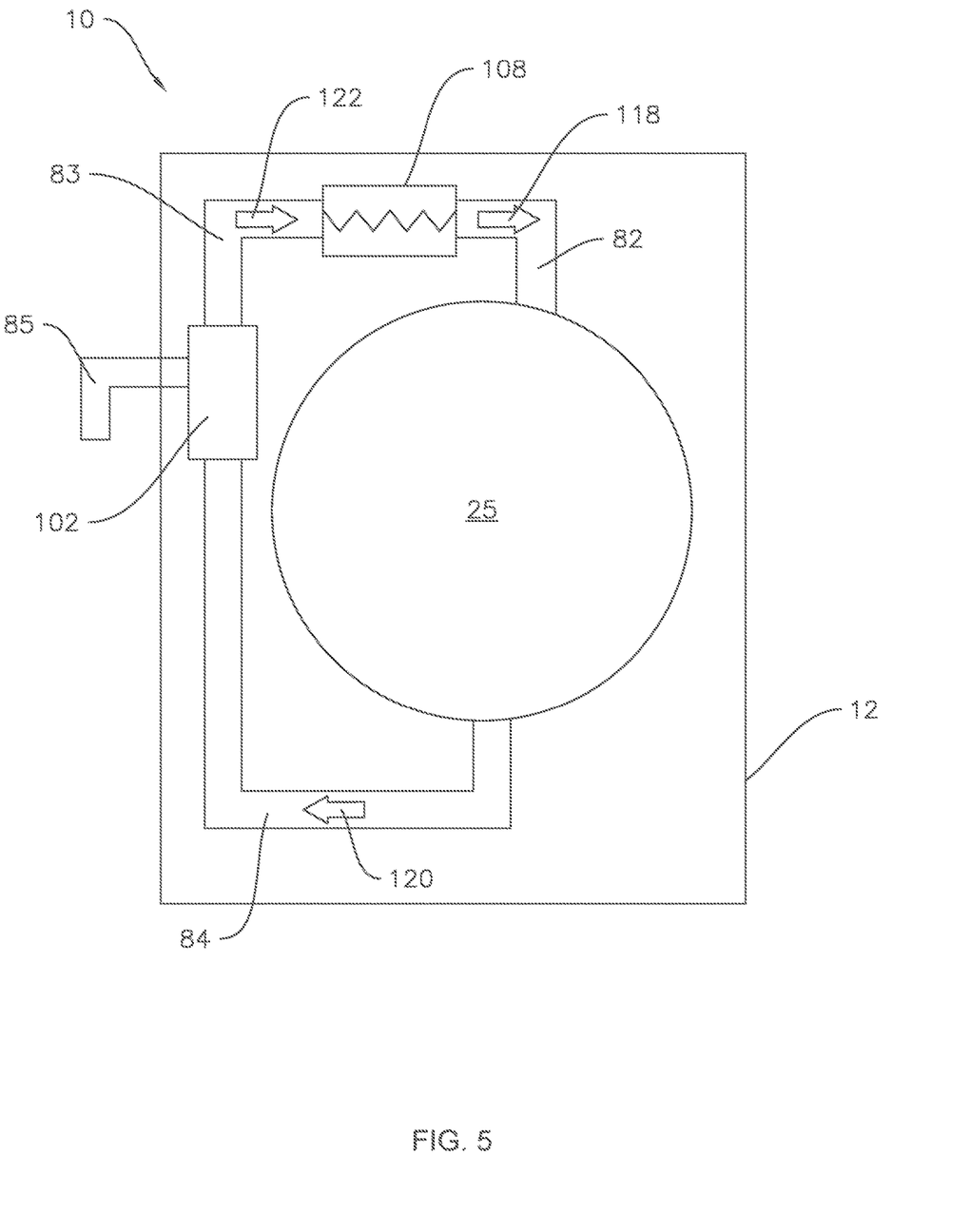
FIG. 5 provides a schematic view of a condensation drying system which may be incorporated into a laundry appliance such as the example laundry appliance of FIG. 1.

In some embodiments, the laundry appliance 10 may be a condensation dryer appliance, e.g., the laundry appliance 10 may include condensation drying features as depicted schematically in FIG. 5. In some embodiments, the laundry appliance 10 may provide ventless drying, e.g., the laundry appliance 10 may not include or require an air vent to direct exhaust or waste air to an ambient environment external to the laundry appliance 10, e.g., an outdoor environment, such that the laundry appliance 10 defines and/or includes a closed-loop air circulation system. In embodiments which include condensation drying features, the laundry appliance 10 may include a condensation surface, e.g., a surface, which may be a cooled surface, on which moisture (water vapor) from the air condenses. For example, a flow of warm saturated air 120 may travel through the return duct 84 from the chamber 25 and then pass over, around, and/or across the condensation surface, which in the illustrated example embodiment is one or more surfaces of an evaporator 102. Condensation collected on the condensation surface may be removed from the interior of the laundry appliance 10 by a drain 85. From the condensation surface, a flow of cool dry air 122 travels through an intermediate duct 83 to a heating element, which may be a heat exchanger such as the condenser 108 in the illustrated example embodiment. The air is heated by the heating element, e.g., condenser 108, in order to supply warm dry air 118 to the chamber 25 via the supply duct 82.

Figure 6:
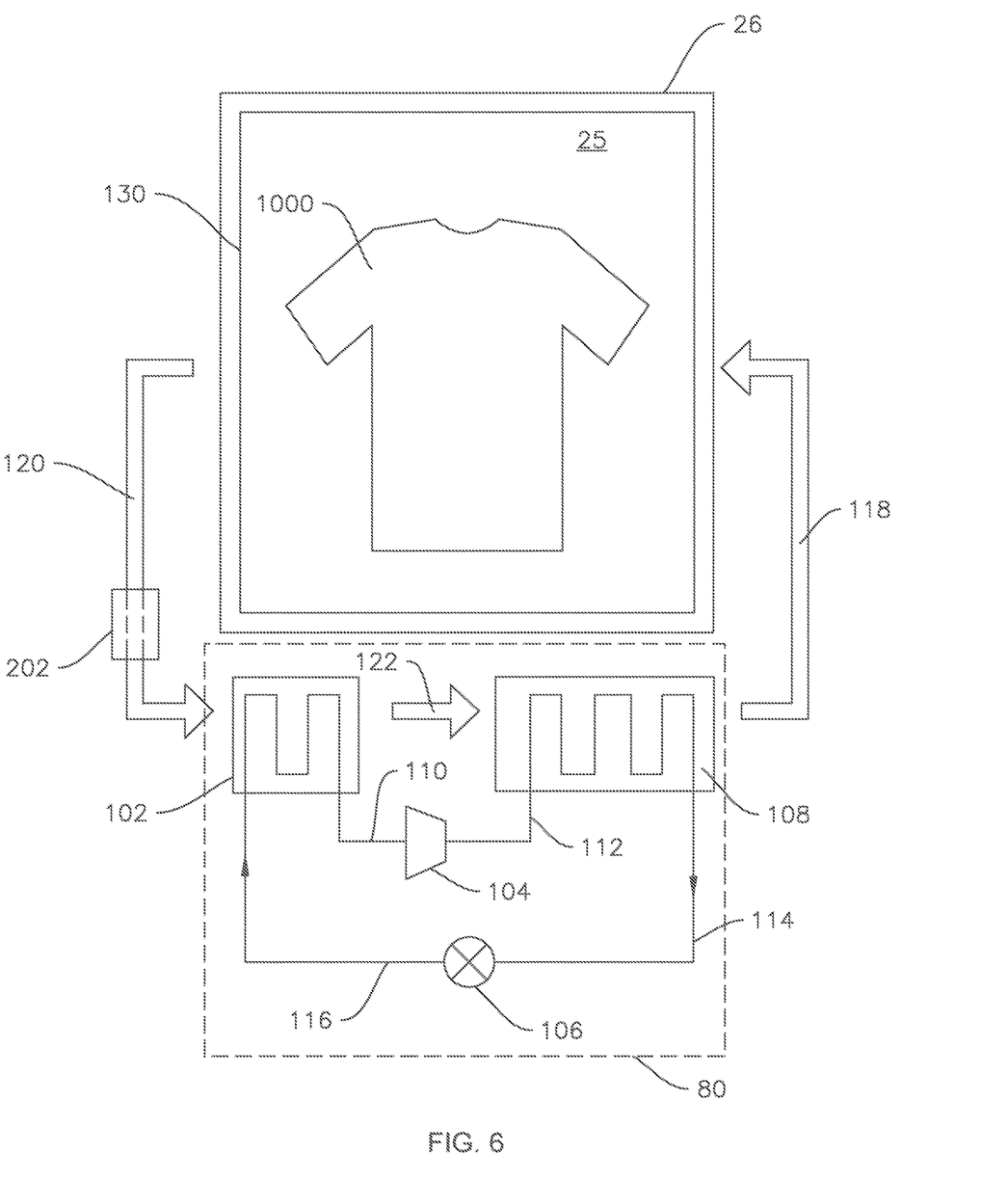
FIG. 6 provides a schematic diagram of an exemplary heat exchange heating system of the example laundry appliance of FIG. 1 according to one or more embodiments of the present disclosure.

Turning now to FIG. 6, a schematic view of selected components of one or more exemplary embodiments of laundry appliance 10 is provided. In particular, FIG. 6 illustrates components used during drying operations of the laundry appliance 10. It is understood that, except as otherwise indicated, laundry appliance 10 in FIG. 6 may include some or all of the features described above with respect to FIGS. 1 through 5.

In operation, one or more laundry articles 1000 may be placed within the chamber 25 of laundry basket 130. Hot dry air 118 may be supplied to chamber 25 whereby moisture within laundry articles 1000 may be drawn from the laundry articles 1000 by evaporation, such that warm saturated air 120 may flow from chamber 25 to an evaporator 102 of the heating system 80, e.g., via the return duct 84 illustrated in FIG. 4. As air passes across evaporator 102, the temperature of the air is reduced through heat exchange with refrigerant that is vaporized within, for example, coils or tubing of evaporator 102. This vaporization process absorbs both the sensible and the latent heat from the moisture-laden air-thereby reducing its temperature. As a result, moisture in the air is condensed and such condensate may be drained from heating assembly 80, as will be understood by those of ordinary skill in the art (such as via the drain 85 depicted in FIG. 5 and described above).

Air passing over evaporator 102 becomes drier and cooler than when it was received from tub 26 of laundry appliance 10. As shown, cool dry air 122 from evaporator 102 is subsequently caused to flow across a condenser 108 (e.g., across coils or tubing of the condenser 108), which condenses refrigerant therein. The refrigerant enters condenser 108 in a gaseous state at a relatively high temperature and pressure compared to the cool, dry air 122 from evaporator 102. As a result, heat energy is transferred to the air at the condenser section 108, thereby elevating the temperature of the air and providing hot dry air 118 for supply to the tub 26 of laundry appliance 10, e.g., via the supply duct 82 illustrated in FIG. 4. The hot dry air 118 passes over and around laundry articles 1000 within the chamber 25 inside of the tub 26, such that warm saturated air 120 is generated, as mentioned above. For example, the hot dry air may circulate around and through the articles 1000 while the articles 1000 are tumbled within the chamber 25 such as by rotating the basket 130, and the tumbling may be promoted by ribs 128 as well. Because the air is recycled through tub 26 and heating system 80, e.g., in a closed-loop as mentioned above, laundry appliance 10 can have a much greater efficiency than traditional clothes dryers where warm, moisture laden air is exhausted to the environment.

As shown in FIG. 6, some embodiments of heating system 80 include a compressor 104 that pressurizes refrigerant (i.e., increases the pressure of the refrigerant) supplied by a suction line 110 and generally motivates refrigerant through the sealed refrigerant circuit of heating system 80. Compressor 104 may be in operable communication with controller 56 and is generally designed to pressurize a gas phase refrigerant. Accordingly, in order to avoid damage, refrigerant in suction line 110 is supplied to the compressor 104 in a gas phase from the evaporator section 102. The pressurization of the refrigerant with compressor 104 increases the temperature of the refrigerant (e.g., as directed by controller 56). The compressed refrigerant is fed from compressor 104 to condenser 108 through line 112. As relatively cool air 122 from the evaporator 102 is passed over the condenser 108, the refrigerant is cooled and its temperature is lowered as heat is transferred to the air for supply to tub 26.

Upon exiting condenser 108, the refrigerant is fed through line 114 to an expansion device 106. Although only one expansion device 106 is shown, such is by way of example only. It is understood that multiple such devices may be used. In the illustrated example, expansion device 106 is a thermal expansion valve. In additional embodiments, any other suitable expansion device, such as a capillary tube, may be used as well as or instead of the thermal expansion valve 106. Expansion device 106 lowers the pressure of the refrigerant and controls the amount of refrigerant that is allowed to enter the evaporator 102 via line 116. Importantly, the flow of liquid refrigerant into evaporator 102 is limited by expansion device 106 in order to keep the pressure low and allow expansion of the refrigerant back into the gas phase in the evaporator 102. The evaporation of the refrigerant in the evaporator 102 converts the refrigerant from its liquid-dominated phase to a gas phase while cooling and drying the air 120 from tub 26. The process is repeated as air is circulated through tub 26 and between evaporator 102 and condenser 108 while the refrigerant is cycled through the sealed refrigerant circuit, as described above.

Figure 7:
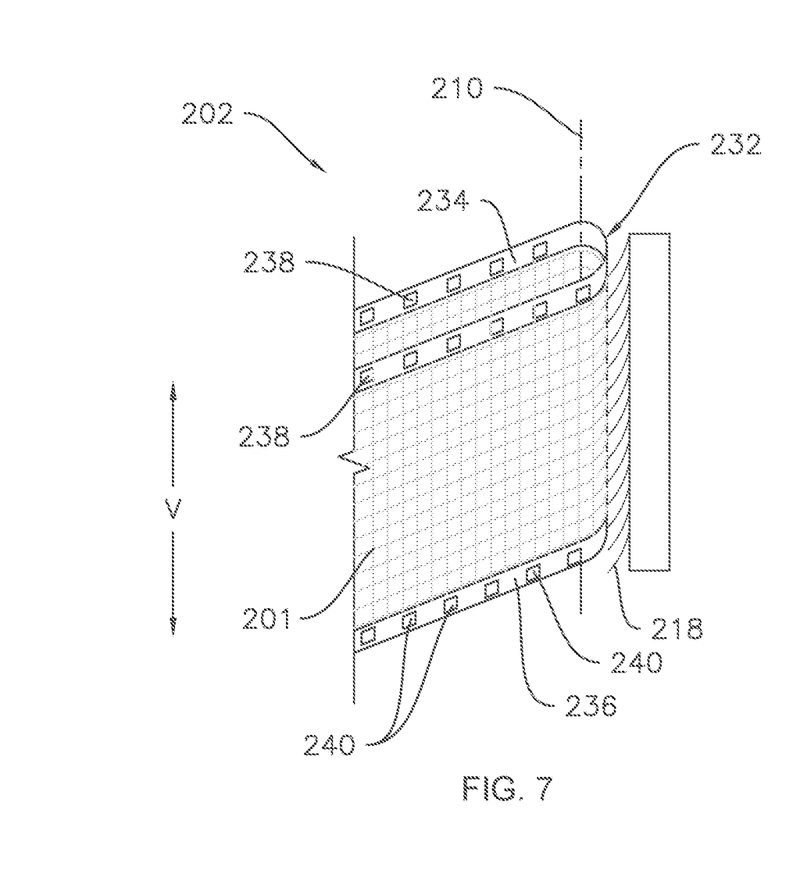
FIG. 7 illustrates a perspective view of a portion of an air filter system according to one or more embodiments of the present disclosure which may be incorporated into a laundry appliance such as the example laundry appliance of FIG. 1.
Figure 8:
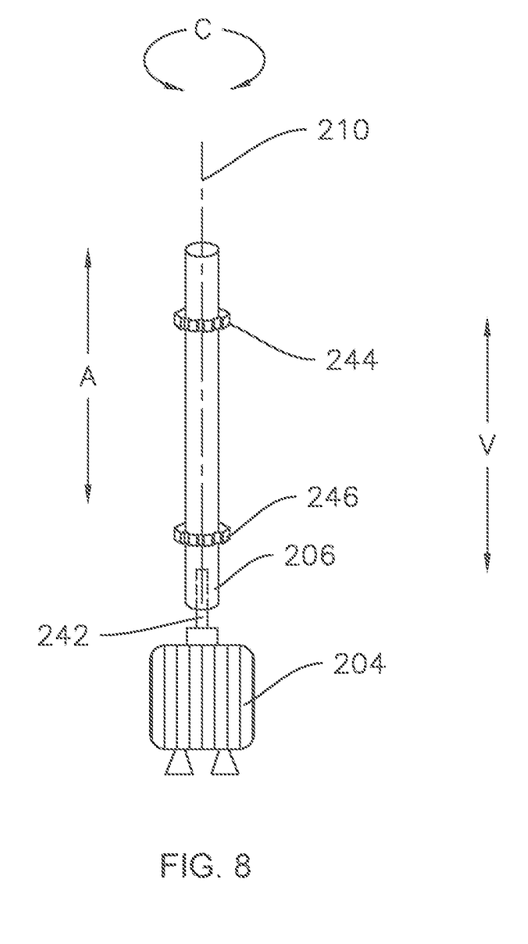
FIG. 8 provides an illustration of another portion of the air filter system according to one or more embodiments of the present disclosure which may be incorporated into a laundry appliance such as the example laundry appliance of FIG. 1.
Figure 9:
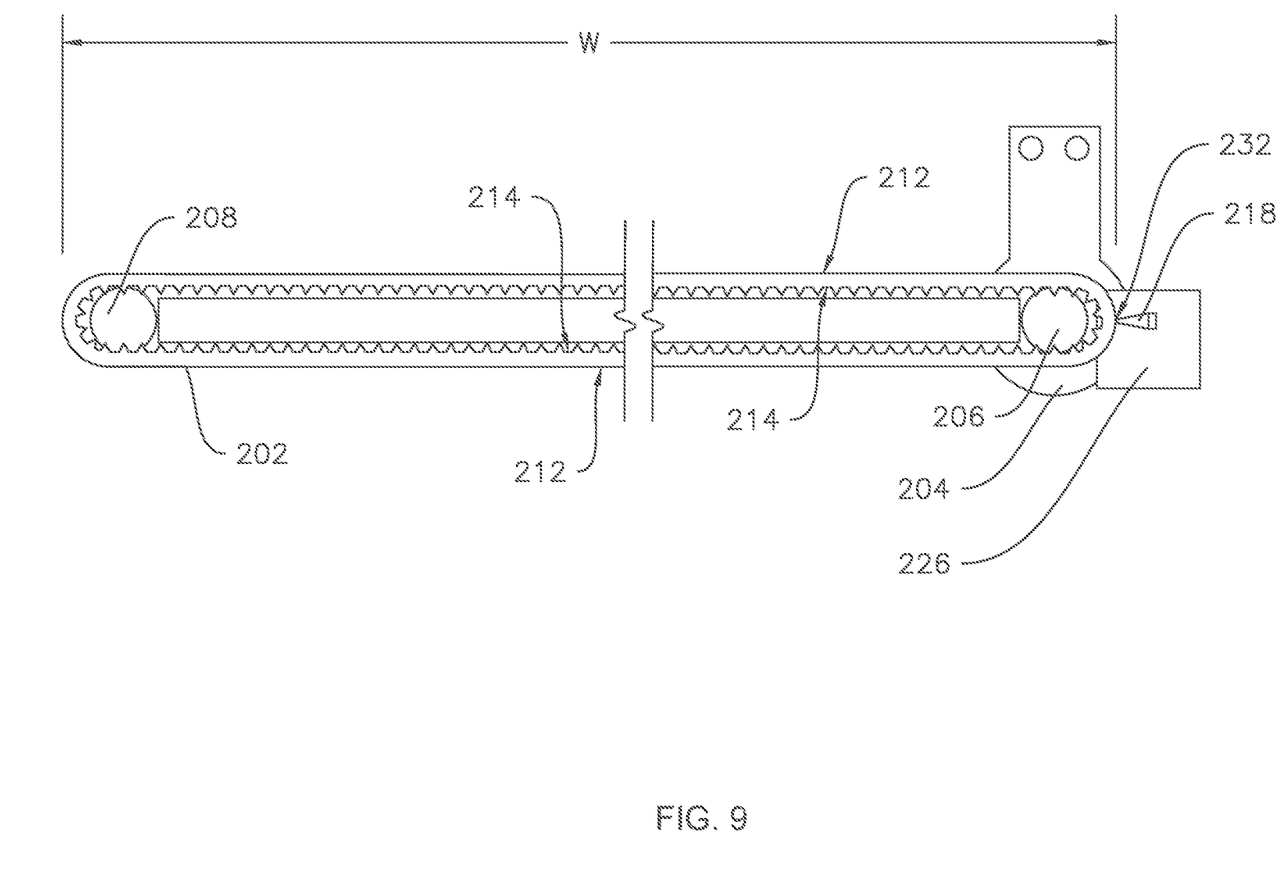
FIG. 9 provides an overhead view of portions of the air filter system according to one or more embodiments of the present disclosure which may be incorporated into a laundry appliance such as the example laundry appliance of FIG. 1.
Figure 10:
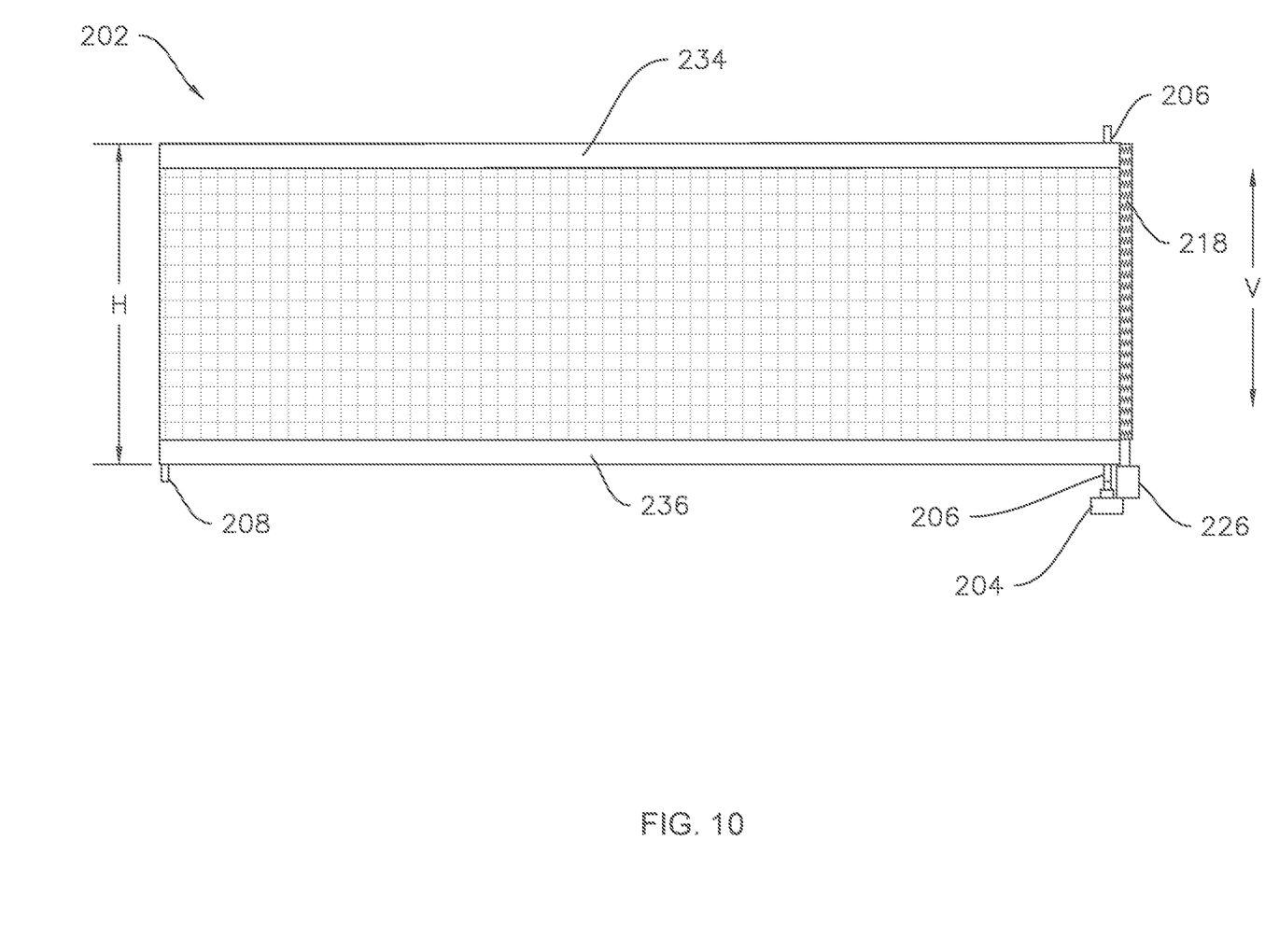
FIG. 10 provides a front view of the air filter system according to one or more embodiments of the present disclosure which may be incorporated into a laundry appliance such as the example laundry appliance of FIG. 1.

As mentioned above, the laundry appliance 10 may include an air filter 202, e.g., positioned between the tub 26 and the heating system 80 with the air filter 202 upstream of the heating system 80, whereby air flowing from the chamber 25 passes through and is filtered by the air filter 202 before flowing to the heating system 80. In some embodiments, the air filter 202 may be a component of an air filter system. For example, in various embodiments, the laundry appliance 10 and/or air filter system may also include a brush 218, e.g., as illustrated in FIGS. 7, 9, and 10. The brush 218 may be positioned adjacent the air filter 202, such as in contact with the air filter along one edge 232 of the air filter 202. As will be described in more detail below, the brush 218 is stationary and the air filter 202 moves relative to the brush 218 to clean the air filter 202. For example, in some embodiments, a motor 204 is operatively connected to the air filter 202, e.g., the motor 204 may be designed or configured to drive, e.g., rotate, the air filter 202 past and across the brush 218 to thereby clean the air filter 202. The stationary brush 218 may be positioned proximate to one of a first roller 206 and a second roller 208. The stationary brush 218 may be in contact with an outer surface 212 of the air filter 202, such that the stationary brush 218 removes the particles from the air filter 202 as the air filter 202 passes the stationary brush 218 while the air filter 202 is rotated around the proximate roller 206 or 208.

As mentioned, the air filter 202 filters the air, e.g., the air filter 202 may remove particles such as lint particles from the air, as well as dust, hair, or other airborne matter, as will be understood by those of ordinary skill in the art. Accordingly, such particles may accumulate on and in the air filter 202, and in particular on an outer surface 212 (FIG. 9) of the air filter 202, over time. If left unchecked, such accumulated particles may eventually obstruct air flow through the filter 202, resulting in reduced efficiency or performance of the air filter 202 and/or the laundry appliance 10, such as the heating system 80 of the laundry appliance 80. Thus, the laundry appliance 10 and/or air filter system may be operable to clean the air filter 202. For example, the laundry appliance 10 and/or air filter system may be operable to automatically clean the air filter 202, such as when motor 204 is activated by the controller 56 to motivate the air filter 202 past and across the brush 218, e.g., bristles thereof. The motor 204 may be activated in response to a user input command and/or in response to a signal from the controller 56 based on, e.g., a predetermined time interval or a detected decrease in air flow into, through, and/or out of the laundry appliance 10, such as into, through, and/or out of the heating system 80 of the laundry appliance 80. Thus, "automatically" cleaning the filter 202 is used herein to indicate that no direct interaction with the air filter 202 is required from a user, while the automatic cleaning may occur in response to a user interaction with an input of the laundry appliance 10, but without the user having to manually access or take out the air filter 202 or clean the air filter 202 by hand.

As illustrated for example in FIGS. 7 through 10, the motor 204 may be operatively connected to the air filter 202. The motor 204 may be any suitable motor, such as a stepper motor. The motor 204 may be configured to move or rotate the air filter 202 relative to the stationary brush 218 and thereby clean the air filter 202. For example, in some embodiments, the laundry appliance 10 may include a first roller 206 and a second roller 208 positioned opposite the first roller 206 along a width W of the air filter 202 (FIGS. 9 and 10), e.g., along a direction generally perpendicular to the vertical direction V. The air filter 202 may be wound around the rollers 206 and 208. For example, the air filter 202 may be tensioned on and by the rollers 206 and 208, e.g., along the direction generally perpendicular to the vertical direction V, such as along the width W of the air filter 202. One of the rollers, e.g., the first roller 206, may be a driven roller. For example, the first roller 206 may be connected to the motor 204 such that the motor 204 is operable to drive, e.g., rotate, the first roller 206. For example, the motor 204 may include a drive shaft 242 and the first roller 206 may be directly coupled to the drive shaft 242, whereby rotation of the drive shaft 242 is directly transferred to the first roller 206. With the air filter 202 wound around the rollers 206 and 208, such rotation of the first roller 206 may cause the air filter 202 to travel, e.g., rotate, around the rollers 206 and 206 and thereby travel past and across the stationary brush 218. Thus, the motor 204 may be operatively connected to the air filter 202 through the driven roller, e.g., first roller 206.

The air filter 202 may comprise a woven or mesh material 201, such as a woven nylon material or other suitable fiber. Accordingly, the air filter 202 may be breathable, e.g., the woven or mesh material of the air filter 202 may allow air to flow through the air filter 202 as described above. As illustrated in FIG. 9, the air filter 202 may include an outer surface 212 and an inner surface 214 which is opposite the outer surface 212.

The brush 218 may include a plurality of bristles, e.g., extending from the brush 218 to the outer surface 212 of the air filter 202. The bristles may contact the outer surface 212 of the air filter 202, such that the bristles engage the outer surface 212 of the air filter 202 when the air filter 202 rotates around the driven roller 206. As a result of such contact/engagement, the bristles of the brush 218 remove particles from the outer surface 212 of the air filter 202 when the air filter 202 rotates around the roller 206.

In some exemplary embodiments, the particles may be extracted from the air filter 202 when the air filter 202 passes over at least one of the first roller 206 and the second roller 208. For example, the air filter 202 may be tensioned by the rollers 206 and 208 as the air filter 202 passes around the rollers 206 and 208, such that the particles entrapped in the air filter 202 are extracted from or wrung out of the air filter 202. The particles entrapped in the air filter 202 may thus be pushed or urged to or towards the outer surface 212 of the air filter 202 as the air filter 202 passes around each roller 206 and 208. Thus, the stationary brush 218 may remove the particles from the air filter 202 as the air filter 202 passes the stationary brush 218. For example, after the particles have been extracted from or pushed out of the air filter 202 by the roller 206 or 208, the stationary brush 218 may then remove such particles from the outer surface 212 of the air filter 202.

The laundry appliance 10 may also include a channel which extends from the air filter system back into the another portion of the laundry appliance 10, e.g., the basket 130 and/or tub 26, and the channel may be accessed via a door 226. In such embodiments, the stationary brush 218 may be positioned proximate the door 226 and above the door 226 along the vertical direction V, such that the particles removed from the air filter 202 by the stationary brush 218 are directed to the door 226 by gravity.

In some embodiments, the driven roller, e.g., the first roller 206 in the illustrated exemplary embodiments, although it should be understood that in additional embodiments, either or both of the rollers 206 and 208 may be directly coupled to and directly driven by the motor 204 (where two motors 204 would be included in embodiments where both rollers 206 and 208 are driven), may define a longitudinal axis 210, e.g., the first roller 206 may extend from a first end to a second end across a major (largest) dimension of the roller 206 and along the longitudinal axis 210. As noted in FIG. 8, the roller 206 may thereby define an axial direction A which is generally parallel to the longitudinal axis 210. In at least some embodiments, the axial direction A may be generally parallel to the vertical direction V. Also as noted in FIG. 8, the roller 206 may further define a circumferential direction C which extends around the longitudinal axis 210. In FIG. 7, the roller 206 is omitted to more clearly illustrate aspects of the air filter 202, but the location of the longitudinal axis 210 is indicated by a dashed line in FIG. 7 to indicate the relative position of the roller 206 with respect to the air filter 202 when the air filter system is fully assembled.

As mentioned, the motor 204 may be operatively connected to the air filter 202 via the driven roller 206. For example, the roller 206 and the air filter 202 may be interengaged by and through one or more sets of gear teeth and one or more corresponding arrays, such as linear arrays, of holes. In some embodiments, the roller 206 may include a first set of gear teeth 244 and a second set of gear teeth 246. Each set of gear teeth 244 and 246 may extend circumferentially, e.g., generally along the circumferential direction C, around the roller 206. In such embodiments, the air filter 202 may include one or more linear arrays of holes, where each linear array of holes is configured, e.g., sized and positioned, to correspond to one of the sets of gear teeth whereby each set of gear teeth may be received in the corresponding array of holes to drive the air filter 202. In some exemplary embodiments, as illustrated in FIG. 7, the air filter 202 may include a first linear array of holes 238 configured to engage the first set of gear teeth 244, e.g., extending along a top edge and/or within a top boundary 234 of the air filter 202, and a second linear array of holes 240 configured to engage the second set of gear teeth 246. For example, the second linear array of holes 240 may extend along a bottom edge and/or within a bottom boundary 236 of the air filter 202. The top boundary 234 and the bottom boundary 236 of the air filter 202 may each include and extend from the respective top and bottom edges of the air filter 202, and encompass about ten percent (10%) or less of the total height H of the air filter 202, such as about seven and a half percent (7.5%) or less of the total height H of the air filter 202, such as about five percent (5%) of the total height H of the air filter 202.

The first set of gear teeth 244 and a second set of gear teeth 246 may be spaced apart from each other along the axial direction A. For example, the first set of gear teeth 244 and the second set of gear teeth 246 may be spaced apart by about a height H (FIG. 10) of the air filter 202, such as by about ninety percent (90%) of the height H of the air filter 202. For example, where the first and second arrays of holes 238 and 240 are positioned in the respective top and bottom boundaries 234 and 236 as described above, the corresponding first and second sets of gear teeth 244 and 246 may be spaced apart by about the same distance along the vertical direction V as the arrays of holes 238 and 240, in order for the first and second sets of gear teeth 244 and 246 to each align with and engage the respective first or second array of holes 238 or 240.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laundry appliance, comprising:
  a cabinet defining an interior volume;
  a laundry basket rotatably mounted within the interior volume of the cabinet, the laundry basket defining a chamber for the receipt of articles for treatment;
  a heating system in thermal communication with the chamber whereby heated air flows from the heating system to the chamber;
  an air filter positioned between the laundry basket and the heating system upstream of the heating system, whereby a flow of return air from the chamber passes through and is filtered by the air filter before flowing to the heating system;
  a brush in contact with the air filter along one edge of the air filter; and
  a motor operatively connected to the air filter via a roller, the motor configured to rotate the air filter past and across the brush to thereby clean the air filter,
  wherein the brush is positioned adjacent the roller and in contact with an outer surface of the air filter directly opposite the roller, wherein particles are extracted from the air filter when the air filter passes around the roller, and wherein the brush removes the extracted particles from the outer surface of the air filter.

2. The laundry appliance of claim 1, wherein the air filter comprises a mesh material.

3. The laundry appliance of claim 1, wherein the brush is stationary.

4. The laundry appliance of claim 1, wherein the motor comprises a drive shaft, the drive shaft is directly coupled to the roller, and the filter is wound around the roller whereby the roller drives the filter past and across the brush.

5. The laundry appliance of claim 4, wherein the roller comprises a set of gear teeth extending circumferentially around the roller and the filter comprises a linear array of holes configured to engage the set of gear teeth.

6. The laundry appliance of claim 5, wherein the roller defines an axial direction, wherein the set of gear teeth is a first set of gear teeth and the linear array of holes is a first linear array of holes, the roller further comprising a second set of gear teeth extending circumferentially around the roller and spaced apart from the first set of gear teeth along the axial direction, and the filter further comprises a second linear array of holes configured to engage the second set of gear teeth.

7. The laundry appliance of claim 6, wherein the first linear array of holes extends along a top edge of the air filter, the second linear array of holes extends along a bottom edge of the air filter, and wherein the second set of gear teeth is spaced apart from the first set of gear teeth by about a height of the air filter.

8. The laundry appliance of claim 4, wherein the roller is a first roller, further comprising a second roller positioned opposite the first roller along a width of the air filter.

9. An air filter system for a laundry appliance, comprising:
  an air filter configured to be positioned between a laundry basket and a heating system of the laundry appliance upstream of the heating system, whereby a flow of return air from the laundry basket passes through and is filtered by the air filter before flowing to the heating system;

a brush in contact with the air filter along one edge of the air filter; and a motor operatively connected to the air filter via a roller, the motor configured to rotate the air filter past and across the brush to thereby clean the air filter, wherein the brush is positioned adjacent the roller and in contact with an outer surface of the air filter directly opposite the roller, wherein particles are extracted from the air filter when the air filter passes around the roller, and wherein the brush removes the extracted particles from the outer surface of the air filter.

10. The air filter system of claim 9, wherein the air filter comprises a mesh material.

11. The air filter system of claim 9, wherein the brush is stationary.

12. The air filter system of claim 9, wherein the motor comprises a drive shaft, the drive shaft is directly coupled to the roller, and the filter is wound around the roller whereby the roller drives the filter past and across the brush.

13. The air filter system of claim 12, wherein the roller comprises a set of gear teeth extending circumferentially around the roller and the filter comprises a linear array of holes configured to engage the set of gear teeth.

14. The air filter system of claim 13, wherein the roller defines an axial direction, wherein the set of gear teeth is a first set of gear teeth and the linear array of holes is a first linear array of holes, the roller further comprising a second set of gear teeth extending circumferentially around the roller and spaced apart from the first set of gear teeth along the axial direction, and the filter further comprises a second linear array of holes configured to engage the second set of gear teeth.

15. The air filter system of claim 14, wherein the first linear array of holes extends along a top edge of the air filter, the second linear array of holes extends along a bottom edge of the air filter, and wherein the second set of gear teeth is spaced apart from the first set of gear teeth by about a height of the air filter.

16. The air filter system of claim 12, wherein the roller is a first roller, further comprising a second roller positioned opposite the first roller along a width of the air filter.

* * * * *